United States Patent

[11] 3,616,031

[72] Inventor Heinz Fleissner
 Egelsbach Bei Frankfurt, Germany
[21] Appl. No. 799,479
[22] Filed Feb. 14, 1969
[45] Patented Oct. 26, 1971
[73] Assignee Vepa AG
[32] Priority Feb. 14, 1968
[33] Germany
[31] P 16 60 795.7
 Continuation-in-part of application Ser. No. 642,496, May 31, 1969.

[54] PROCESS FOR BONDING FELTS AND NEEDLED FELTS
 18 Claims, 3 Drawing Figs.
[52] U.S. Cl. .................................................. 156/285,
 28/72.3, 156/306
[51] Int. Cl. .............................................. B65h 75/06
[50] Field of Search .......................................... 156/285,
 306, 311, 320, 321, 322, 286–287, 281, 309,
 62.2–62.8; 28/72.3; 65/4, 9

[56] References Cited
 UNITED STATES PATENTS
 2,417,453 3/1947 Wade ........................... 156/148 X
 2,586,774 2/1952 Bastian et al. ................. 49/17
 2,881,505 4/1959 Hoffman ....................... 28/72.2
 3,276,944 10/1966 Levy ............................. 156/306 X
 3,333,316 8/1967 Cosnard ....................... 28/72.3
 3,365,766 1/1968 Tewksbury et al. ........... 28/72.3 X Primary Examiner—Carl D. Quarforth
Assistant Examiner—Gary G. Solyst
Attorney—Craig, Antonelli, Stewart and Hill ABSTRACT: The present disclosure relates to a process and apparatus for bonding felts or feltlike materials which comprises adding to the materials to be bonded a synthetic bonding fiber thereby forming a fiber blend and fuse-bonding the fiber blend by heat-treating said blend to the sticking or melting point of the bonding fibers and setting the fiber blend by cooling down the bonded fibers, said heat-treatment and cooling down stages being effected shocklike by passing at least part of the heating and cooling treatment medium through the material being treated. The present disclosure is particularly directed to the use of steam during the treatment process as well as to the application of pressure to the fiber blend while said blend is in a heated state.

PATENTED OCT 26 1971 3,616,031

(A-A)

(B-B)

Inventor:
HEINZ FLEISSNER

By Craig, Antonelli, Stewart & Hill
ATTORNEYS

PROCESS FOR BONDING FELTS AND NEEDLED FELTS

The present application is a continuation-in-part application of application Ser. No. 642,496, filed May 31, 1967.

BACKGROUND OF THE INVENTION

The present invention relates to a process and apparatus for bonding felts, needled felts, feltlike materials and similar products wherein a synthetic bonding fiber is added to said materials to be bonded and the resulting fiber blend is heated and cooled shocklike by passing at least part of the heating and cooling treatment medium through said fiber blend. More particularly, the present invention is directed to the use of steam or a steam-air mixture during the treatment process as well as to the application of pressure to the fiber blend while said blend is in a heated state.

Felts, needled felts, feltlike materials and similar products must be bonded together because otherwise they possess a low mechanical strength. The particular kind of bonding is of significant importance with respect to the properties of the finished nonwovens. It is well known to effect bonding by means of powdery bonding agents, solutions of bonding agents, aqueous plastic dispersions or by means of fibers contained in the fleece. Bulky products are exclusively bonded by one of the first three bonding methods mentioned. Bonding with aqueous plastic dispersions has recently created substantial interest. However, these methods incorporate the disadvantage that the bonding agent cannot be distributed uniformly in the felt and that during bonding the bonding agent tends to migrate to the heat source, that is to the surface of the fleece so that the surface becomes hard or is at least bonded more than the rest of the felt.

Bonding using bonding fibers contained in the felt offers the advantage that in the manufacture of the felt the bonding fibers can be distributed uniformly throughout the felt. If partially dissolving fibers are used as bonding fibers, a strong felt or needled felt can be obtained by partially dissolving these fibers and by utilizing a subsequent drying step. This type of felt looses very little volume as a result of the impregnation or partial dissolution and subsequent drying. However, the manufacturing process as such is expensive and thus its frequent use has been limited thereby.

Another method for bonding feltlike materials comprises adding thermoplastic fibers to the fiber blend and subsequently bonding the felt or needled felt under pressure and heat by means of a calender. Fibers of synthetic materials such as polyamides, polyethylene, polyvinyl chloride, etc., can be used as thermoplastic fibers. However, this process incorporates the disadvantage that a felt made by a hot calendering process looses much of its volume and receives a paper or cardboardlike appearance. Tests made up to now for making felt or a bulky bonded needled felt by adding melting or sticking fibers have not been successful. When subjecting the material to hot air or an infrared radiation, only the melting or sticking fibers at the surface of the felt or needled felt melts, and the felt or needled felt shrinks in the melting range and tends to roll up.

Recently, bulky felt or similar types of fiber products have almost exclusively been bonded by means of aqueous plastic dispersions. In general, the material is impregnated in a padder and bonded by means of a hot-air treatment on a felt dryer or sieve drum dryer comprising several sieve drums. On the sieve drum dryer the treatment air is drawn through the fleece. The heating up of the fleece as well as the curing and/or bonding time can be substantially reduced as compared with other plants. However, the synthetic resin or latex solution undesirably partly deposit on the conveying elements causing them to become soiled in a relatively short period of time, so that frequent cleaning and maintenance work is required.

SUMMARY OF THE INVENTION

It is an object of the present invention to avoid the prior art disadvantages in the bonding of felts, needled felts, feltlike materials and similar products.

Another object of the present invention is to provide an improved process and apparatus for the bonding of feltlike materials wherein synthetic bonding fibers are added to the material to be bonded and the heat-treatment and cooling treatment medium is drawn through the material to be bonded by means of a suction draft.

A further object of the present invention is to provide an improved process and apparatus for the bonding of feltlike materials wherein during the heat-treatment and cooling stages of the process, the material being treated is maintained at a predetermined distance from the conveying surface.

Still another object of the present invention is to provide an improved process and apparatus for the bonding of feltlike materials which harden and/or yellow when subjected to a hot-air treatment.

A still further object of the present invention is to provide an improved process and apparatus for the bonding of feltlike materials wherein the product is more elastic and softer and thus the textile properties of the nonwoven product are more pronounced.

Other object and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved process and apparatus for the bonding of feltlike materials can be obtained by adding melting or sticking fibers to the felt or feltlike materials and by effecting a heat treatment and preferably a cooling down and/or setting of the feltlike materials, shocklike, by passing a gaseous treatment medium, preferably air, at least partially through the material being treated. It is advantageous that the gaseous treatment medium is passed through the felt by means of a suction draft. Tests have shown that depending on the desired strength characteristics of the felt, the amount of sticking or melting fibers present can be varied between about 10 and 70 percent and bonding fibers with an adhesive state, i.e., a sticking and/or melting point in the range of about 100° to 300° C. can be effectively used. It has been found that without the addition of any chemicals or solvents, a homogenous bonding can be obtained by drawing the hot gaseous treatment medium, for example, air, through the felt or feltlike materials.

The felt, needled felt, or feltlike materials bonded by the process of the present invention include any of the natural or synthetic fibers including the glass and metallic fibers. The natural fibers can include cotton, wool, silk, etc., and the synthetic fibers may comprise the thermoplastic or thermosetting synthetic polymers such as polyolefins, e.g., polethylene, polypropylene, etc., polyamides, e.g., nylon 6 obtained by the polycondensation of caprolactam, nylon 66 obtained by the condensation of hexamethylenediamine with adipic acid, etc., polyesters, e.g., polyethylene terephthalate, etc., phenolic resins, e.g., phenol formaldehyde resins, urea formaldehyde resins, etc., polyvinyl materials, e.g., polyvinyl chloride, polyvinyl acetate, etc., acrylate resins, e.g., polymethyl methacrylate, copolymers of these materials with one another or with ehtylenically unsaturated monomers, and similar type polymers.

The bonding fibers which can be added to the felt or needled felt materials according to the present invention comprise the same thermoplastic or thermosetting synthetic polymers which can be used as the felt materials which have a sticking or melting point which is lower than the corresponding felt or needled felt material being bonded. For example, a feltlike material consisting of a polyester with a melting point of 250° C., can be bonded with a nylon fiber having a melting point of 215° C., if the bonding process is conducted at a temperature higher than 215° C. but lower than 250° C., for example, about 230° C.

In order to carry out the process of the present invention continuously and effectively, it is expedient if the felt or similar type material rests during the suction draft treatment on the conveying means. The conveying means may consist of a metal cloth or may be covered with a metal cloth. It has been found advantageous to use sieve drums as the conveying means, e.g., one sieve drum during the heat-treatment stage and one sieve drum during the setting stage, each sieve drum being subjected to a suction draft. It is not advisable to use several sieve drums for the heat-treatment stage as there is the danger of a deformation of the felt at the point of passage between two sieve drums.

It has been found that in the manufacture of felt, or feltlike materials, that is, in the process stage before bonding, it is generally very difficult to obtain a substantially uniform thickness of the felt over large working widths. According to a further embodiment of the present invention, it is therefore desirable to level out the thickness of the felt between two cooling surfaces, for example, cooling rollers, after the heat treatment, in order to obtain a uniform felt thickness. While the felt is heated, it can easily be deformed. By using cooling rollers, the surfaces become smoother and more uniform since as a result of the cooling, the surface of the felt becomes bonded. Also, soiling of the rollers is thus avoided.

In a particularly preferred embodiment of the present invention it is suggested to use steam or at least a steam/air mixture as the gaseous treatment medium for fibers, such as polyamides, which harden and/or yellow when subjected to a hot-air treatment. Tests have shown that when using a steam atmosphere, particularly a superheated steam atmosphere, the product becomes much more elastic and softer, and thus the textile properties of the nonwoven product are more pronounced. Apart from better textile properties, it has been found that with several fibers, e.g., polyamides, the bond at the fiber joints is better and firmer when the material is exposed to water steam than it is when the material is exposed merely to hot air.

Furthermore, it has been found that substantially better and more uniform bonding can be obtained in the process and apparatus of the present invention, if the fleece and/or the felt is subjected to pressure while in a hot state. The pressure treatment causes a relative motion of the fibers at the joints, and in this way a better and firmer bonding is obtained. Also, it is advantageous if, depending on the composition of the fleece, the suction draft is varied. In this way particularly bulky fleeces can be produced. The suction draft can be varied in an effective way by varying the fan speed.

An effective apparatus for carrying out the process according to the present invention comprises the combination of a heating chamber with a conveying means subjected to a suction draft, preferably a sieve drum, a pair of cooling rollers which are arranged outside of the heating chamber, and another conveying means subjected to a suction draft, for example, a sieve drum, disposed in a cooling chamber and provided for the shocklike cooling down and setting of the felt or feltlike material. Advantageously, the cooling rollers are disposed between the heating chamber and the cooling chamber and provide a conveying and leveling surface for the material being treated therebetween. It is desirable if the conveying means subjected to a suction draft has a surface comprising a wide-meshed metal cloth. Alternately, said means can be covered with a wide-meshed metal cloth. Alternately, said means can be covered with a wide-meshed metal cloth. This wide-meshed metal cloth offers the advantage that the conveying means is not soiled during the treatment process and that an extremely uniform suction draft can be maintained. It is advantageous if the felt can be maintained at a distance of preferably about 1-2 mm. from the conveying means subjected to a suction draft. This can be achieved, for example, by using a wire cloth with a wire thickness of about 0.5 to 1 mm. diameter and with a mesh, for example, of about 5 openings per cm.

In known sieve drum dryers, the fresh air is generally drawn in at the outlet. With the aforementioned apparatus for bonding needled felts, this arrangement has not proven desirable since the fleece is slightly cooled down by the fresh air when it leaves the heating chamber. Consequently, it is more desirable to draw the fresh air into the heating chamber at the inlet, preferably beneath the inlet conveying element, e.g., beneath the inlet conveyor belt. At the outlet and preferably also at the inlet of the heating chamber, a deflector roller may be mounted at that portion of the sieve drum which is covered with the material being treated. Although the deflector roller at the outlet may be rigidly supported, it is desirable to support the deflector roller at the inlet either adjustably or resiliently. With this type of support, it can be immediately and readily noticed from the position of the deflector roller whether or not there are any speed differences between the inlet conveying element, i.e., the inlet conveyor belt, and the sieve drum, so that any speed differences can readily be balanced. The speeds of the sieve drum and the inlet conveying elements are infinitely variable, independently of each other.

The conveying and guiding elements of the cooling chamber may substantially correspond to those of the heating chamber. However, they are arranged homologously to those of the heating chamber, i.e., at the inlet of the cooling zone the rigidly supported deflector roll is situated and at the outlet is disposed a roller which is adjustable, e.g., may be swivel mounted. This roller can be adjusted to apply a force against the material being treated. A conveyor belt or a chute may be provided beneath the felt material to facilitate its removal from the cooling zone.

It has been found advantageous to arrange the cooling rollers in such a way that the nip is outside the supporting plane of the adjacent deflector rollers which are mounted at the inlet and/or outlet of the subsequent and the preceding treatment devices. For example, the cooling rollers may be positioned in a plane above the supporting plane of the adjacent deflector rollers.

Cooling of the material during the setting treatment can be effected by means of ambient air or by means of outside air. If the cooling drum is surrounded by a casing, the casing may be opened at the top or may be provided with an air-permeable ceiling which serves for filtering the ambient air which is drawn into the apparatus. When cooling with the ambient air, the casing is provided with a supply duct for the outside air. Also, the air which is drawn out of the drum and heated can be discharged into the ambient workshop or into the open air through an air discharge duct. According to another feature of the present invention, the cooling chamber can be designed as a conditioning compartment and the climate in the compartment can be set in such a way that the overdried felt is in hygroscopic balance when leaving the conditioning compartment.

When steam or steam-air mixtures are used as the treatment medium rather than hot air, for example in the treatment of polyamide fibers, the well-known drying device containing at least one sieve drum subjected to a suction draft is provided with a steam-generating device and/or a device which injects steam into the treatment chamber. According to the present invention the steam can also be generated in a sieve drum dryer by passing an endless blanket together with the nonwoven product through the treatment chamber and by humidifying the blanket before it enters the treatment chamber. The evaporated water is drawn through the nonwoven product and has a similar effect as a pure steam atmosphere.

According to the present invention floor coverings and materials used for similar applications are provided with a soft, textilelike surface, if they are supported unilaterally on the conveying elements during the strengthening process, i.e. during the entire treatment process. The contact surface is the reverse side of the product.

The following examples are given as illustrative of the present invention and are not to be considered as limiting.

EXAMPLE I

A felt or needled felt material having a weight of 300 g./m.² and bonded at a temperature of 150° C. had the following composition:

| | |
|---|---|
| 30% | blended polymerisate fiber, 7 denier, 60 mm. thickness, sticking point 90° C., melting point 170° C. |
| 70% | viscous staple fiber, 10 denier, 60 mm. fiber without a sticking and melting point |
| 100% | |

EXAMPLE II

A needled felt or felt having a weight of 600 g./m.² and bonded at a temperature of 190° C. had the following composition:

| | |
|---|---|
| 40% | polypropylene fiber, 15 denier, 80 mm. thickness |
| 60% | lambswool, class B fiber, without a sticking and melting point |
| 100% | |

EXAMPLE III

A needled felt or felt with a weight of 1,200 g./m.² and bonded at a temperature of 230° C. had the following composition:

| | |
|---|---|
| 45% | Nylon 6, 15 denier, 60 mm. thickness melting point 215° C. |
| 55% | polyester fiber, 10 denier, 80 mm. thickness melting point 250° C. |
| 100% | |

EXAMPLE IV

A needled felt or felt with a weight of 1,800 g./m.² and bonded at a temperature of 280° C. had the following composition:

| | |
|---|---|
| 55% | Nylon 66, 10 denier, 60 mm. thickness melting point 250° C. |
| 50% | glass fiber, 10 denier, 80 mm. thickness |
| 100% | |

The materials mentioned in the above examples were bonded on a sieve drum drier with a drum diameter of 1,400 mm. with 8 mm. perforations. The perforated sieve drums were covered with a wire mesh having a wire thickness of 1 mm. and a clear mesh width of 1.5 mm. as well as a wire number of 5 per cm.

The use of the wire mesh offers the advantage that the felt or needled felt does not rest directly on the drum jacket and that the treatment medium is only drawn through at the perforations. The metal cloth rests punctiformly on the drum jacket, and because of this a constant distance of about 2 mm. is maintained between the surface of the drum jacket and the material through which the treatment medium is to be passed. Thus, a completely uniform penetration of the felt and the wire mesh with hot air is ensured, so that the sticking or melting fibers added to the felt or needled felt bond securely with the nonsticking or nonmelting fibers, or fibers which do not melt homogeneously under an areal shrinkage of 5 to 15 percent. When bonding the needled felts listed in the above-mentioned examples, a conveying apparatus with an indirect oil-heating means can be used so that the temperature can be kept constant within ±2° C. by means of a suitable control. Thus, the temperature accuracy is ensured over the whole working width of the conveying means. However, any type of controlled heating means whether direct or indirect can be used and disposed in any portion of the apparatus as long as it is provided in the circulation of the treatment medium.

Since the felt or feltlike material generally has a moisture content at the inlet of the treatment apparatus in an amount of about 2 to 15 percent, depending on the material used, the temperature of the hot air should advantageously be about 5 to 30 percent higher than the sticking and/or melting point of the bonding fiber.

For cooling and setting the hot felt or needled felt, a second conveying means, e.g., a sieve drum dryer is often used wherein cold air is passed through the felt thereby fixing it.

Using the process and apparatus of the present invention, it is readily possible to make a bonded felt or needled felt with a thickness of about 1 to 30 mm. and a weight of about 100 to 3000 g./m.². When using another wire mesh, it is possible to exceed or fall below these values.

BRIEF DESCRIPTION OF THE DRAWINGS

The present invention will become fully understood from the detailed description given hereinbelow and the accompanying drawings which are given by way of illustration only and thus are not limitative of the present invention and wherein.

DESCRIPTION OF THE PREFERRED EMBODIMENTS

Figure 1:
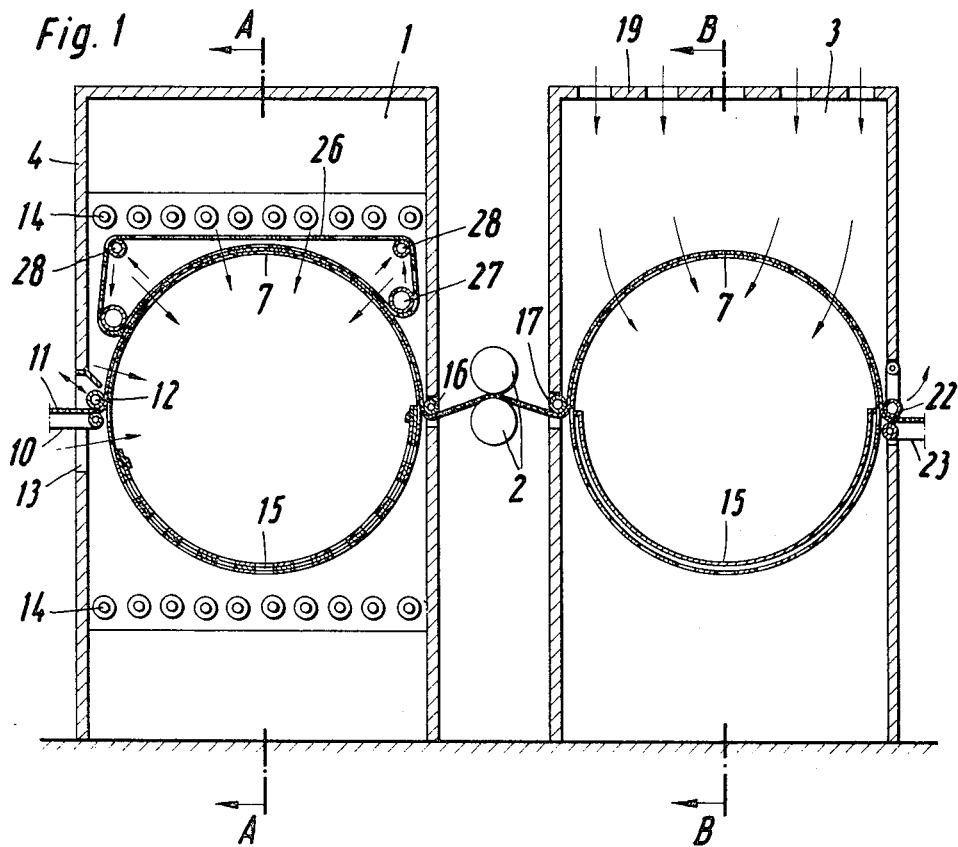
FIG. 1 is a longitudinal section of the apparatus according to the present invention.
Figure 2:
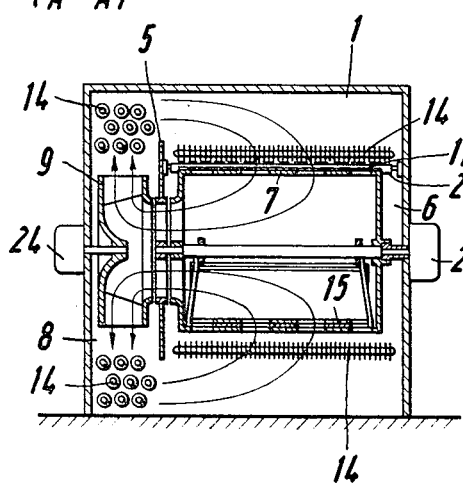
FIG. 2 is a cross section of the heating chamber of the apparatus according to FIG. 1.
Figure 3:
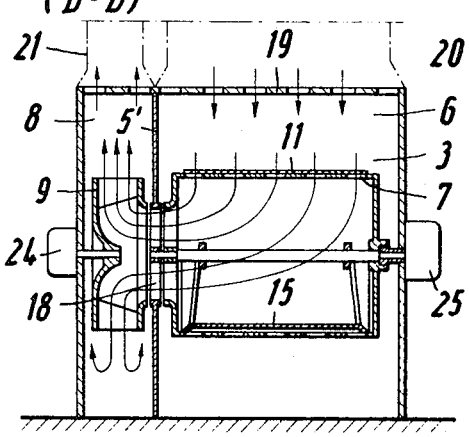
FIG. 3 is a cross section of the cooling chamber of the apparatus according to FIG. 1.

Referring now to the drawings wherein like reference numerals are used throughout the various views to designate like parts, the apparatus of the present invention comprises a heating chamber 1 and a pair of cooling rollers 2 and a cooling chamber 3. The heating chamber has a heat-insulating housing 4 which is subdivided by a partition 5 into a treatment chamber 6 with a sieve drum 7 subjected to a suction draft and a fan chamber 8 with a fan wheel 9 which is correlated to the face of the sieve drum. For feeding felt 11 to the system, a conveyor belt 10 as well as a roller 12 which is supported, adjustably, are provided at the inlet. In this apparatus, the fresh air is drawn in beneath the conveyor belt 10 through an opening 13.

By means of the fan wheel 9 a partial vacuum and thus a suction draft is produced in the drum, by means of which a gaseous treatment medium, preferably air, is drawn through the material being treated, i.e., through the felt 11. The air circulated in the heating chamber 1 is heated by means of a heating device. The heating device may, for example, consist of ribbed tubes 14 which are arranged above and beneath the fan wheels 9 and above and beneath the sieve drum 7. A baffle 15 is disposed in the sieve drum 7 and comprises two perforated sheaths which are slidably adjustable to each other, so that the suction draft at that portion of the sieve drum which is not covered with the material being treated can be varied and even reduced to zero. At the outlet of the heating chamber 1 a rigidly supporting roller 16 is provided for deflecting the felt 11. A corresponding roller 17 is situated at the inlet of the cooling chamber 3. The cooling chamber is of similar design as the heating chamber. Partition means 5' which separates the treatment chamber 6 from the fan chamber 8 is passed through the whole chamber so that in the cooling chamber the fan chamber 8 and the treatment chamber 6 are only connected with each other by a cast-iron spider 18. A ceiling 19 of the casing is air-permeable and preferably designed as a sieve sheet. The cooling air may be drawn in from the environment, e.g., the workshop and discharged into the ambient workshop. However, it is also possible to draw fresh air into the treatment apparatus from outside the workshop where the apparatus is set us, e.g., through a suction duct 20 (indicated by the dash-dot line). In the same way, the heated discharge air may be discharged into the open air through an air discharge duct 21 (indicated by the dash-dot line). At the outlet of the cooling chamber 3 a swivel mounted roller 22 and a conveyor belt 23 are provided. Instead of the conveyor belt 23 a chute can be used. The fan drive 24 and the drum drive 25 are each separately provided for the heating chamber 1 and the cooling chamber 3.

The sieve drum in the heating chamber can be advantageously provided with a wire mesh belt 26, shown by the dashed line, which is passed over guide rollers 27 and 28. The rollers 28 are adjustable, as indicated by the arrows, and serve as tensioning rollers. The wire mesh belt 26 is thus forced against the felt 11 with an initial stress, and in this way a better bonding of the felt at the fiber joints is achieved.

Since modifications of this invention will be apparent to those skilled in the art, it is not desired to limit the invention to the exact constition shown and described. Accordingly, all suitable modifications and equivalents may be resorted to which fall within the scope of the appended claims.

It is claimed:

1. A continuous process for bonding and strengthening feltlike materials which comprises the following steps of adding a bonding fiber to the feltlike material thereby forming a fiber blend, the sticking or melting point of the bonding fiber being lower than that of the feltlike material; fuse-bonding the fiber blend by heat-treating said blend on a sieve drum subject to a suction draft with hot air, steam, superheated steam or a steam-air mixture as the treatment medium, to the sticking or melting point of the bonding fiber; and setting the fiber blend by cooling down the bonded fiber on a different sieve drum subject to a suction draft, said heat-treatment and cooling down steps being effected shocklike in respective heating and cooling chambers by passing at least part of the heating and cooling treatment medium through said fiber blend.

2. The process of claim 1, wherein during the heat-treatment and cooling stages the fiber blend is supported and conveyed on a perforated surface subjected to a suction draft.

3. The process of claim 2, wherein during the heat-treatment and cooling steps the fiber blend is maintained at a predetermined distance from the conveying surface.

4. The process of claim 1, wherein after the heat-treatment step the fiber blend is passed between cooling surfaces to obtain a uniform felt thickness.

5. The process of claim 1, wherein a fresh treatment medium is drawn into the heating chamber at the inlet thereof.

6. The process of claim 5, wherein the fresh treatment medium is air and is drawn into the heating chamber at the inlet and below the point at which the fiber blend is introduced into the heating chamber.

7. The process of claim 1, wherein the cooling down process is effected by ambient air, outside air or conditioned air which is drawn through the fiber blend.

8. The process of claim 1, wherein the fiber blend is subjected to a pressure treatment during at least part of the heating treatment.

9. The process of claim 1, wherein during the treatment process only one side of the fiber blend is contacted on the surfaces of the sieve drum.

10. The process of claim 1, wherein the fiber blend is conveyed through the heat-treatment step together with a humidified endless blanket and during said heat-treatment stage the water in said humidified blank is evaporated thereby producing a steam atmosphere, said steam being drawn through the fiber blend.

11. A continuous process for bonding and strengthening feltlike materials which comprises the following steps of adding about 10 to 70 percent of a synthetic bonding fiber to a feltlike material thereby forming a fiber blend, the sticking or melting point of the synthetic bonding fiber being about 100° to 300° C. and lower than that of the feltlike material, fuse-bonding said fiber blend by heating said blend on a sieve drum subjected to a suction draft, to the melting or sticking point of the synthetic fiber with hot air, steam, superheated steam or a steam-air mixture as the treatment medium, contacting the fiber blend with cooling surfaces to obtain a uniform felt thickness, and setting said fiber blend by cooling down the bonded fibers on a different sieve drum subjected to a suction draft, said heat-treatment and cooling down steps being effected shocklike in respective heating and cooling chambers by passing at least part of the heating and cooling treatment medium through said fiber blend.

12. The process of claim 11 wherein during the heat-treatment and cooling steps one surface of the fiber blend is supported on sieve drum means and subjected to a suction draft.

13. The process of claim 12, wherein during the heat-treatment and cooling steps, the fiber blend is maintained at a predetermined distance from the conveying surface.

14. The process of claim 11, wherein the feltlike material is selected from the group consisting of natural fibers, synthetic fibers, glass fibers and metallic fibers.

15. The process of claim 11, wherein the feltlike material is wool and the synthetic bonding fiber is polypropylene.

16. The process of claim 11, wherein the feltlike material is glass fiber and the synthetic bonding fiber is the condensation product of hexamethylenediamine with adipic acid.

17. The process of claim 11, wherein the feltlike material is polyethylene terephthalate and the synthetic bonding fiber is the polycondensation product of caprolactam.

18. The process of claim 12, wherein the fiber blend is compressed against the surface of the sieve drum during the heating step by a wire mesh belt thereby effecting a better bonding of the fiber points in the fiber blend.